United States Patent [19]
Childers et al.

[11] Patent Number: 5,610,902
[45] Date of Patent: Mar. 11, 1997

[54] ADAPTER CARTRIDGE AND CADDY COMBINATION FOR HUBLESS OPTICAL DISK

[75] Inventors: Edwin R. Childers; Michael Henry, both of Tucson, Ariz.

[73] Assignee: International Business Machines Corporation, Armonk, N.Y.

[21] Appl. No.: 679,165

[22] Filed: Jul. 12, 1996

Related U.S. Application Data

[63] Continuation of Ser. No. 450,750, May 25, 1995, abandoned.

[51] Int. Cl.⁶ ................................................. G11B 23/03
[52] U.S. Cl. ................................ 369/289; 369/191
[58] Field of Search ................................ 369/34, 36, 77.1, 369/77.2, 178, 192, 289, 290, 291, 191; 360/133

[56]  References Cited

U.S. PATENT DOCUMENTS

| | | | |
|---|---|---|---|
| 3,845,502 | 10/1974 | Paus | 360/86 |
| 4,545,045 | 10/1985 | Baer et al. | 369/77.2 |
| 4,614,474 | 9/1986 | Sudo | 369/192 |
| 4,682,313 | 7/1987 | Miyake | 369/291 |
| 4,694,448 | 9/1987 | Tamura et al. | 369/291 |
| 4,773,058 | 9/1988 | Petruchik et al. | 369/77.2 |
| 4,853,926 | 8/1989 | Covington et al. | 369/291 |
| 4,908,817 | 3/1990 | Sandell et al. | 369/291 |
| 4,945,530 | 7/1990 | Sandell et al. | 369/291 |
| 4,980,883 | 12/1990 | Mutou et al. | 369/291 |
| 4,998,618 | 3/1991 | Borgions | 369/36 |
| 5,067,121 | 11/1991 | Einhaus | 369/75.2 |
| 5,073,889 | 12/1991 | Rayner | 369/291 |
| 5,077,625 | 12/1991 | Shiba et al. | 360/133 |
| 5,091,898 | 2/1992 | Bessho et al. | 369/77.2 |
| 5,140,489 | 8/1992 | Barnard | 369/291 |
| 5,208,802 | 5/1993 | Suzuki et al. | 369/289 |
| 5,253,246 | 10/1993 | Leonhardt et al. | 369/291 |
| 5,329,516 | 7/1994 | Hoshi et al. | 369/77.1 |

FOREIGN PATENT DOCUMENTS

| | | |
|---|---|---|
| 2002481 | 3/1989 | Canada . |
| 0463575A2 | 6/1990 | European Pat. Off. . |
| 0518259A2 | 12/1992 | European Pat. Off. . |
| 60-214485 | 10/1985 | Japan . |
| 62-47893 | 3/1987 | Japan . |
| 2-121174 | 5/1990 | Japan . |
| 2128388 | 5/1990 | Japan ................... 369/291 |
| 2-187973 | 7/1990 | Japan . |
| 3-185689 | 8/1991 | Japan . |

Primary Examiner—Stuart S. Levy
Assistant Examiner—Brian E. Miller
Attorney, Agent, or Firm—Baker, Maxham, Jester & Meador

[57] ABSTRACT

A cartridge which comprises an adapter cartridge and a caddy is employed for containing a hubless optical disk which can be processed in a standard optical disk drive for cartridges, such as an optical disk drive for an optical disk storage library. The adapter cartridge and the caddy are each provided with a recess so that when the adapter cartridge and the caddy are mated an enclosure is provided for the disk. The adapter cartridge carries a floating hub which engages a spindle in a drive for rotating the disk. The standard drive has a shutter arm which is employed for first ejecting the adapter cartridge from the drive and then is employed for ejecting the caddy and the disk from the adapter cartridge. This makes the caddy and disk readily accessible to a picker of a storage library for transport purposes or to an operator.

26 Claims, 9 Drawing Sheets

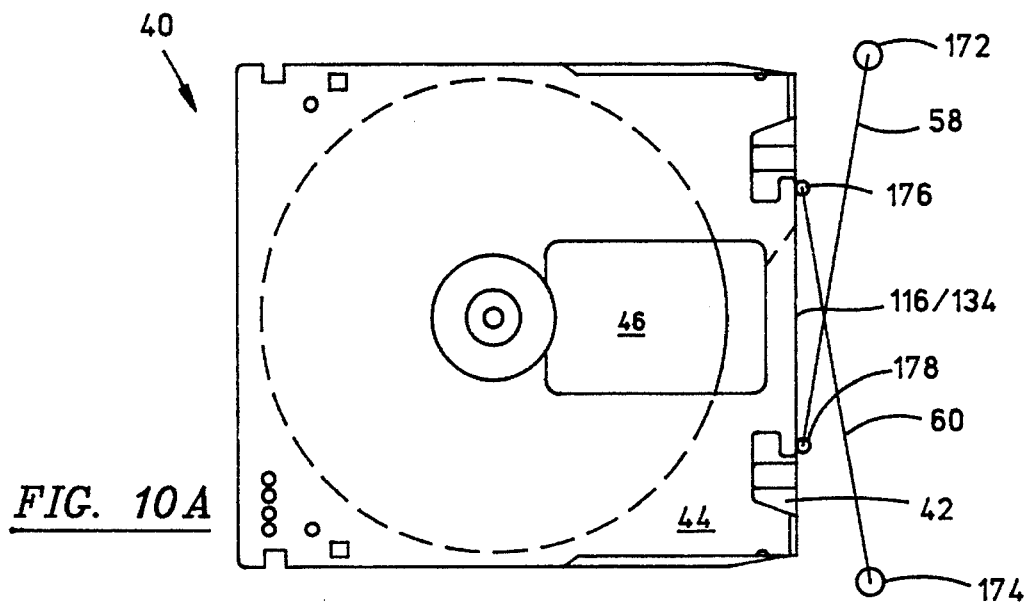
FIG. 10A
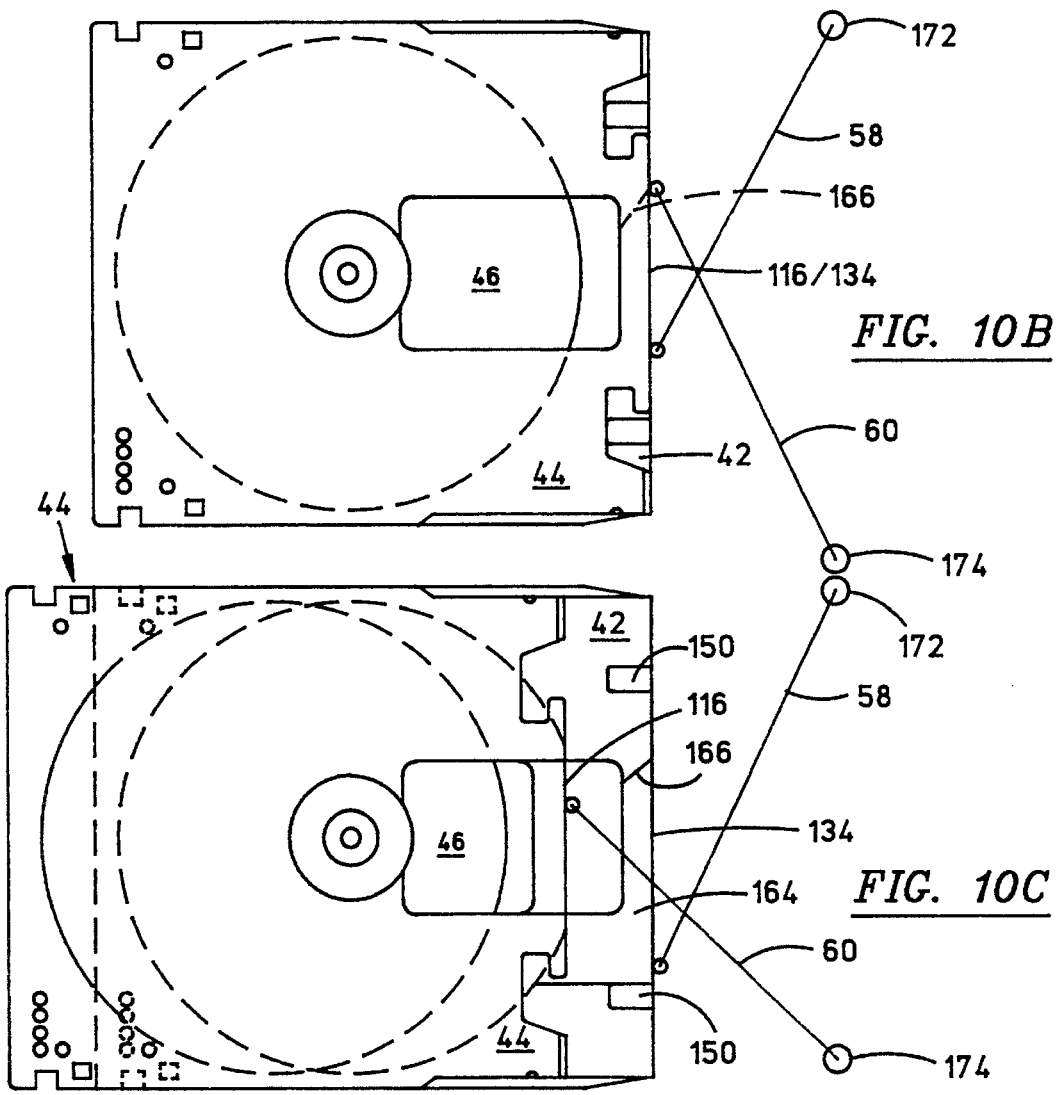
FIG. 10B
FIG. 10C

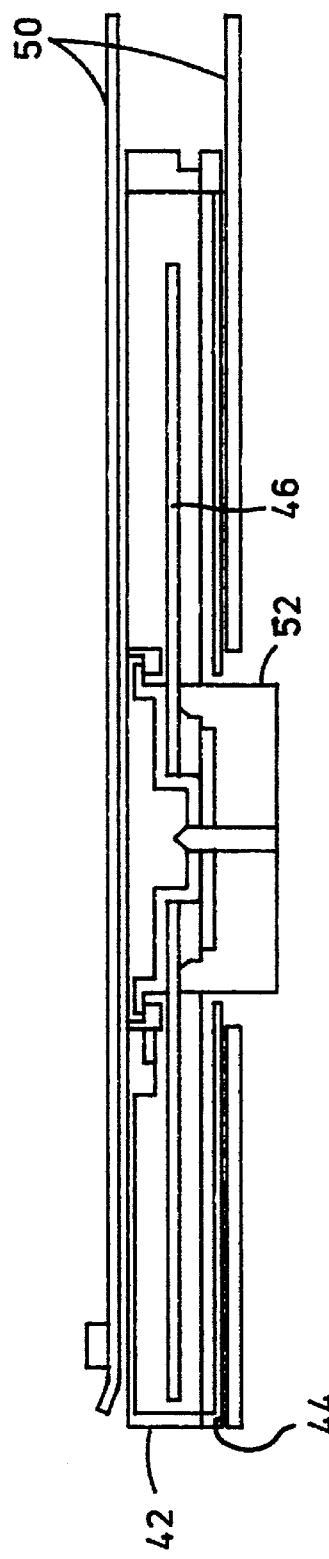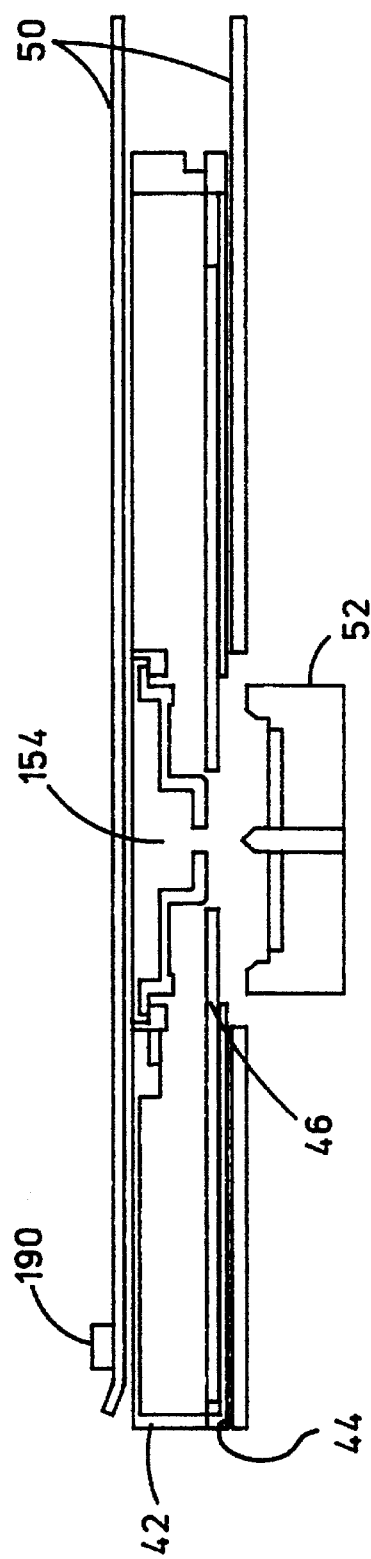

5,610,902

ADAPTER CARTRIDGE AND CADDY COMBINATION FOR HUBLESS OPTICAL DISK

This application is a continuation of application Ser. No. 08/450,750, filed May 25, 1995, now abandoned.

BACKGROUND OF THE INVENTION

1. Field of the Invention

The present invention relates to a cartridge for a hubless optical disk and more particularly to an adapter cartridge and caddy which can be mated to provide a cartridge which enables a hubless optical disk to be written and read in a standard optical drive.

2. Description of the Related Art

Optical disks are frequently employed for data storage libraries because of the high amount of data which can be stored per disk area. The disks are stored in bins and are transported in cartridges between the bins and an optical disk drive by a picker which is mounted for vertical and horizontal movements. Some optical disks can be written only once while others can be written many times like a magnetic disk. Either type of cartridge can be employed in an optical disk storage library.

The typical optical disk employed in a storage library is double sided and has a hub at its center. The standard cartridge requires that the disk have the central hub. A typical optical disk drive has a spindle which engages the hub and rotates the disk for reading or reading and writing by an optical element. The hub is an expensive component of the optical disk. It would be desirable if the hub could be eliminated for standard optical disk drives in order to reduce the overall cost of an optical disk library.

Another cost factor of an optical disk storage library is the requirement that each optical disk be provided with a cartridge. In the past it has been accepted that a cartridge is required to handle an optical disk for transport between storage bins and a disk drive. While the cartridge is necessary to interface the optical disk with drive components there is a strong felt need to transport optical disks between the drive and the storage bins without the expense providing a cartridge for each optical disk.

SUMMARY OF THE INVENTION

A cartridge is provided for a hubless optical disk which can be employed in a standard optical disk drive and which capitalizes upon components in the standard drive for making an optical disk accessible for automated or manual handling during insertion in or removal from the disk drive. This is accomplished by a combination that includes an adapter cartridge and a caddy which mates to the adapter cartridge. Each of the adapter cartridge and the caddy have a recess. The optical disk rests in the recess of the caddy. When the adapter cartridge and the caddy are mated the recesses provide an enclosure for containing the disk. When the cartridge adapter is partially inserted in the disk drive the caddy and the disk can be slid underneath the adapter cartridge until stops on the adapter cartridge implement mating of both components. The adapter cartridge is provided with a floating hub which takes the place of the hub on the prior art disk. When a disk loader in the drive moves the adapter cartridge downwardly the floating hub is received in a central hole in the hubless disk and a spindle in the drive makes engagement with a bottom of the disk. The disk is then rotated by the spindle so that it can be processed by an optical element in the drive.

The adapter cartridge and the caddy are further specially configured so that shutter arms within the drive can be employed to partially eject the adapter cartridge from the drive and then partially eject the caddy and the disk from the cartridge. In the standard optical disk drive a pair of shutter arms move parallel to the top and bottom sides of the cartridge for opening top and bottom apertures in the standard cartridge so that the optical element can process the disk. When the prior art cartridge is inserted in the disk drive these shutter arms are spring biased to open the cartridge. In the present invention one of these shutter arms is employed to first move the adapter cartridge partially from the drive and then is employed to move the caddy with the disk partially from the adapter cartridge. The disk can then be transported on the caddy without the necessity of transporting the entire cartridge as required by the prior art. This is accomplished by configuring the leading edge of the adapter cartridge with a cutout so that the shutter first pushes on the cartridge, which moves both the adapter cartridge and the caddy out of the drive, and then the shutter arm operates through the cutout to push only on the caddy to push the caddy out of the adapter cartridge and farther out of the drive. By storing caddies instead of cartridges, the storage density of the library can be increased substantially two fold.

An object of the present invention is to provide a cartridge for a hubless disk medium which can be employed in a standard disk drive.

Another object is to provide a cartridge which has a hub which engages a hubless disk and cooperates with a spindle in a standard disk drive for rotating the disk.

A further object is to enable transport or removal of a disk without transporting the entire cartridge along with the disk.

Still another object is to provide a cartridge which comprises an adapter cartridge, which carries a floating hub for a hubless disk, and a caddy which supports the disk and which can be mated with the adapter cartridge for providing an enclosure for the disk.

Still a further object is to provide an adapter cartridge which enables processing of a hubless disk in a standard drive and a caddy which carries the disk and is ejected from the adapter cartridge outside the drive for easy access to a cartridge by a picker or an operator.

Yet another object is to provide an optical disk storage library which has higher storage density and which is less costly than prior art disk storage libraries.

These and other objects and advantages of the invention will become more apparent to one skilled in the art upon reading the description of the invention in light of the accompanying drawings.

BRIEF DESCRIPTION OF THE DRAWINGS

FIG. 10A is a schematic illustration of the present cartridge fully inserted in a standard optical disk drive against spring biased shutter arms within the drive.

FIG. 10B is the cartridge partially ejected from the drive by the top shutter arm.

FIG. 10C is a schematic illustration of the caddy portion of the invention partially ejected from the adapter cartridge portion by the bottom shutter arm.

FIG. 13 is a vertical cross-sectional view of the cartridge and disk of the present invention inserted within the loader tray of a standard optical disk drive with the spindle of the drive engaged with the cartridge and the disk.

FIG. 14 is the same as FIG. 13 except the spindle of the drive is disengaged from the cartridge and the optical disk.

DESCRIPTION OF THE PREFERRED EMBODIMENT

Figure 1:
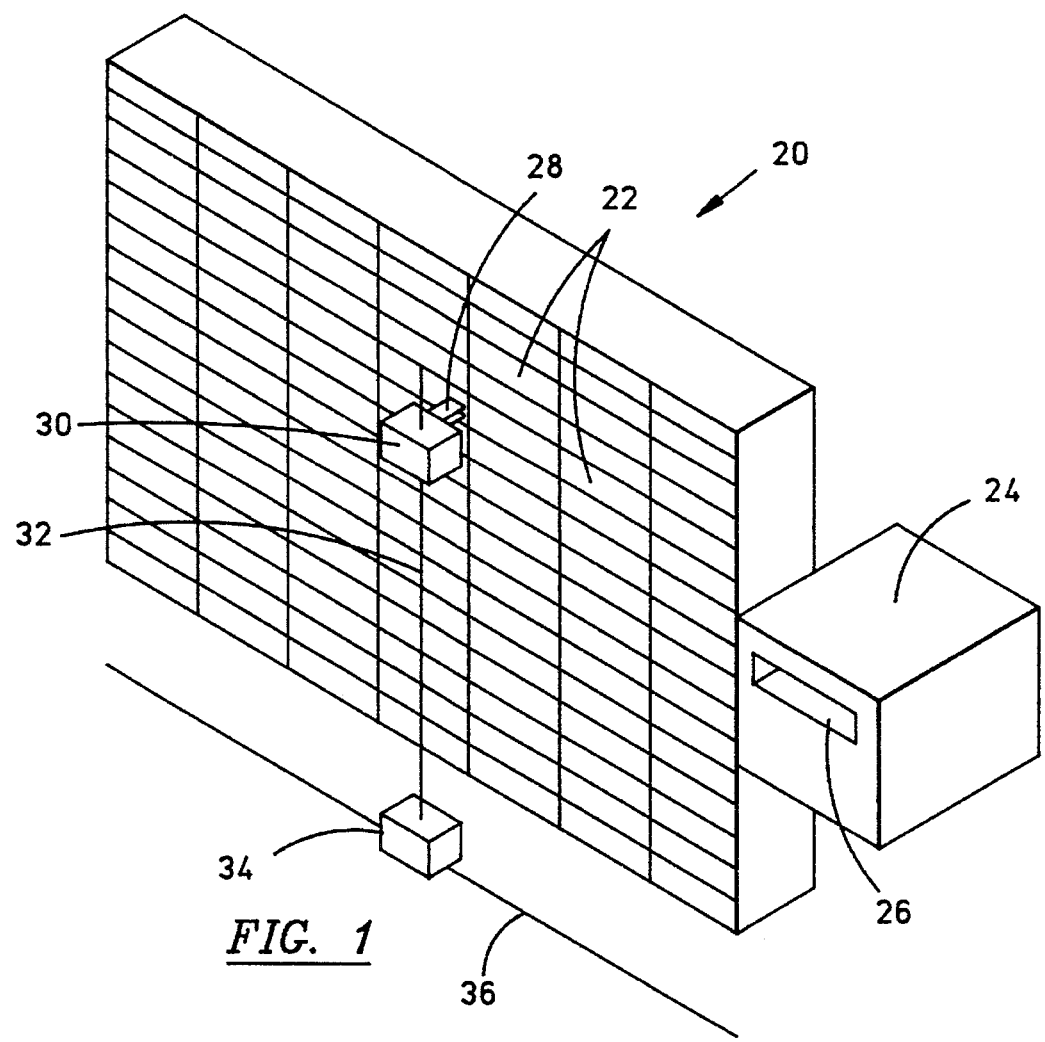
FIG. 1 is an isometric illustration of an exemplary optical disk storage library with optical disk storage bins, optical disk drive, picker, and transport system.

Referring now to the drawings wherein like reference numerals designate like or similar parts throughout the several views, there is illustrated in FIG. 1 an exemplary optical disk storage library 20 which includes a plurality of optical disk bins 22 and an optical disk drive 24, the optical disk drive 24 having a cartridge opening 26. A picker 28 is provided for picking optical disks from the bins 22 and from the drive 24 through the opening 26. In the past these disks have been transported within cartridges, the cartridges being picked by the picker at the bins and the drive. As will be explained in detail hereinafter, the present invention eliminates transporting disks within cartridges which significantly lowers the cost of constructing the optical disk storage library 20. The picker 28 is mounted on a vertical carriage 30 which in turn is movable on a vertical track 32. The vertical track 32 is mounted on a horizontal carriage 34 which is movable along a horizontal track 36.

Figure 2:
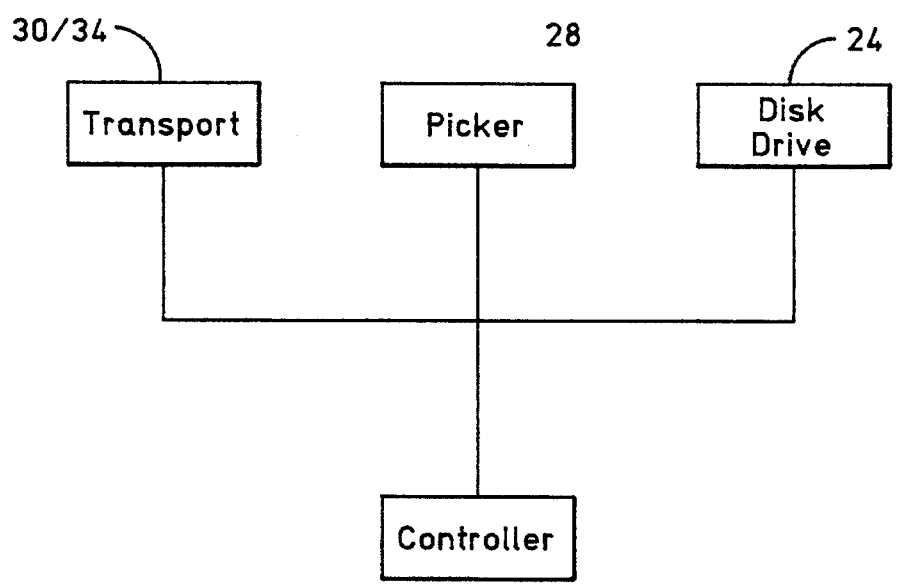
FIG. 2 is a block diagram of an exemplary electrical scheme for controlling the picker, transport system, and disk drive.

FIG. 2 is a block diagram of an exemplary electrical arrangement for the optical disk storage library 20 of FIG. 1. The transport includes the carriage 30, the vertical track 32, the horizontal carriage 34, and the horizontal track 36. The disk drive includes the disk drive 24 of FIG. 1 and comprises a loader tray and spindle which will be described in more detail hereinafter. The transport, picker, and disk drive are controlled by a controller which synchronizes the movable components and transport of selected optical disks. Additional details on the transport components can be found in application Serial No. 08/363,164 entitled "Quick Access Data Storage Library with Backup Capability" filed Dec. 22, 1994 by K. E. Dimitri, which application is commonly assigned to IBM and which application is incorporated by reference herein. The picker 28 will be described in more detail hereinafter.

Figure 3:
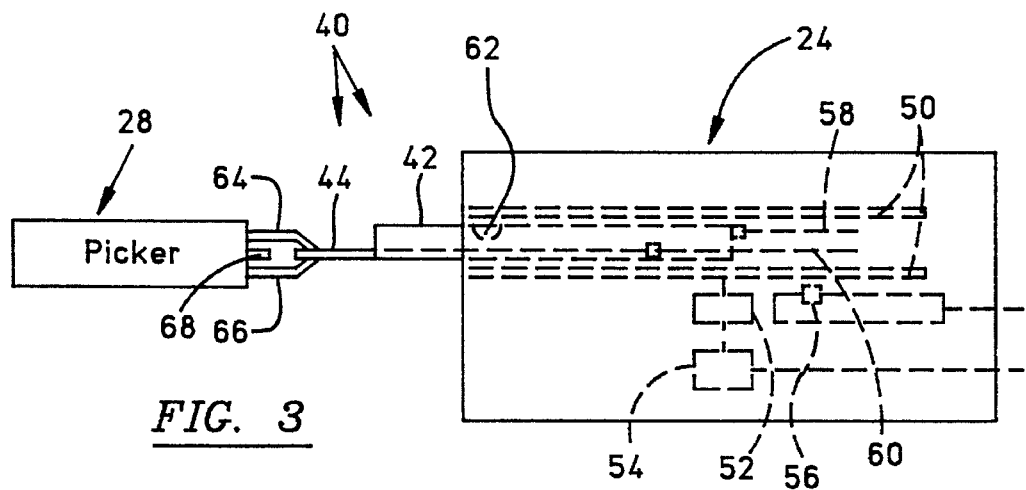
FIG. 3 is a vertical schematic illustration of the present adapter cartridge and caddy in a standard disk drive, the caddy being removed by a picker.

FIG. 3 shows the present cartridge 40 in combination with the disk drive 24 and the picker 28. The cartridge 40 of the present invention includes an adapter cartridge 42 and a caddy 44 which will be described in detail hereinafter. Within the caddy 44 is a hubless single-sided optical disk 46 which can be seen in FIG. 5. The optical disk 46 has a central opening 48. As shown in FIG. 3, the disk drive 24 includes the following: a loader tray 50 for receiving the cartridge 40 of the present invention; a spindle 52 which is driven by a motor 54 and which is employed for rotating the disk within the cartridge 40; an optical lens 56, which is part of an optical head (not shown), for reading or writing and reading the optical disk; and spring biased shutter arms 58 and 60 for opening first and second shutter doors of a standard optical disk cartridge so that the disk is accessible to the optical lens 56. When a cartridge 40 is fully inserted in the disk drive 24, the loader trays 50 move the cartridge downwardly to engage the motor spindle 52 whereupon the disk in the cartridge is rotated and processed by the lens 56.

Figure 4:
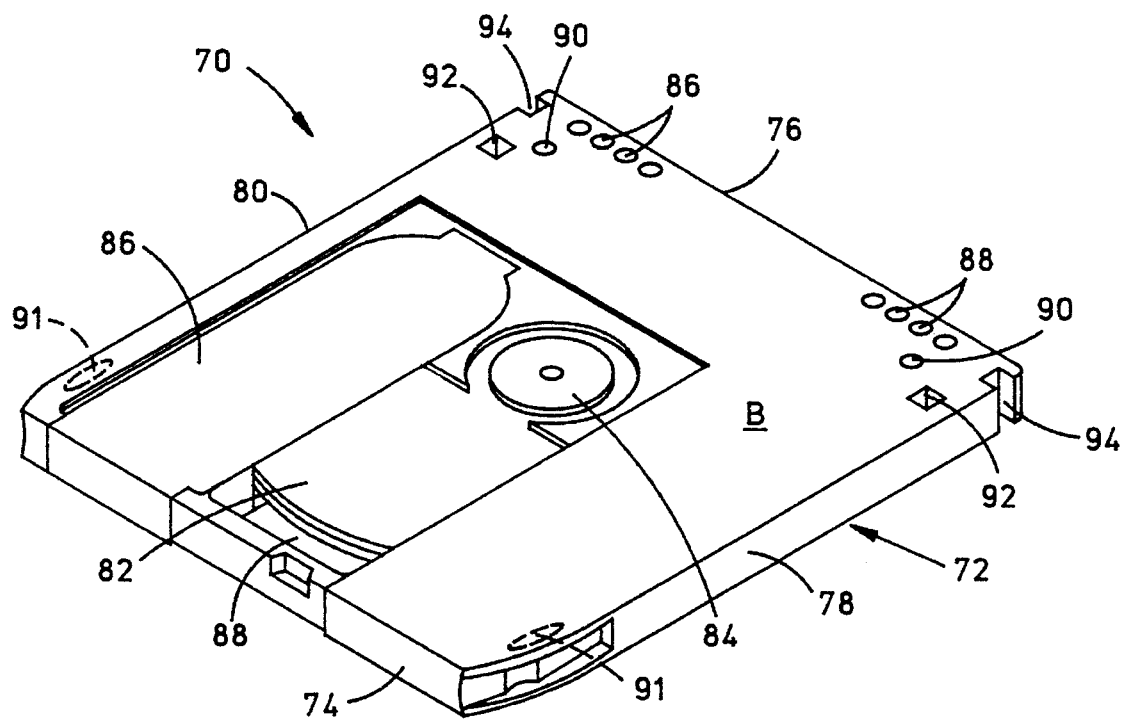
FIG. 4 is an isometric illustration of a standard optical disk cartridge.

In FIG. 3 the adapter cartridge 42 portion of the present invention has been partially ejected from the disk drive by the shutter arm 60 and is retained in this position, shown by a detent 62, while a caddy portion with the disk is partially ejected from the adapter cartridge 42 by the shutter arm 60. The detent can be located inside or outside the drive, as desired. The picker 28 has top and bottom arms 64 and 66 which grab the caddy 44 and remove the caddy 44 from the adapter cartridge 42 for transport to a library storage bin 22 as shown in FIG. 1. Alternatively, the picker 28 may be involved in the process of inserting the caddy 44 and disk into the adapter cartridge 42 after picking the caddy 44 from the storage library bin 22 and transporting it to the disk drive. While still in a grab mode, the arms 64 and 66 of the picker insert the caddy 44 into the adapter cartridge 42 and the adapter cartridge 42 into the disk drive, the final insertion of the cartridge into the disk drive being implemented by a plunger 68 which will be described in more detail hereinafter. A significant advantage of the present invention is that optical disks are transported within a caddy 44 rather than being transported in a prior art cartridge 70 as shown in FIG. 4.

The prior art cartridge 70 includes a cartridge container 72 which has sides A and B (B being shown in FIG. 4), sides A and B being bounded by leading and trailing edges 74 and 76 and side edges 78 and 80. The cartridge 70 contains a standard double-sided optical disk 82 which is provided with a hub 84. When the cartridge 70 is loaded in the disk drive 24 of FIG. 3, the loader trays 50 move the cartridge 70 downwardly so that the motor spindle 52 makes engagement with the hub 84 and rotates the disk 82. As will be explained in detail hereinafter, the present invention eliminates the requirement of the hub 84 which significantly decreases the cost of making the optical disks.

The cartridge 70 includes a shutter door 86 which opens and closes an aperture 87 in side B of the cartridge. The same shutter door 86 bends around to side A of the cartridge and opens an opposite aperture (not shown) of the cartridge. When the shutter door opens an aperture, the optical disk 82 can be read by an optical lens 56 as shown in FIG. 3. The shutter door 86 is opened toward side 80 by shutter arm 58 in FIG. 3 when side B of the cartridge 70 is facing downwardly in the disk drive and the shutter door 86 is opened toward side 80 by the shutter arm 60 when side A of the cartridge 70 is facing downwardly within the disk drive. In the present invention, the shutter arms 58 and 60 of FIG. 3 are employed for a different purpose which was explained hereinabove and which will be explained in more detail hereinafter.

The prior art cartridge 70 includes sensing holes 88 for side A and sensing holes 89 for side B, these sensing holes being read within the drive for determining information about the optical disk 82 in the cartridge. Write protect holes 90 are provided for sides A and B for protecting the optical disk from a write operation. Locating datums 91 and holes 92 are provided for positioning the cartridge within the disk drive, the holes 92 receiving pins (not shown) from the cartridge for stabilizing the disk's position. The prior art cartridge is also provided with notches 94 which may be used for implementing transport of the cartridge. The items set forth in this paragraph are standard configurations set forth by the ANSI Standard.

Figure 5:
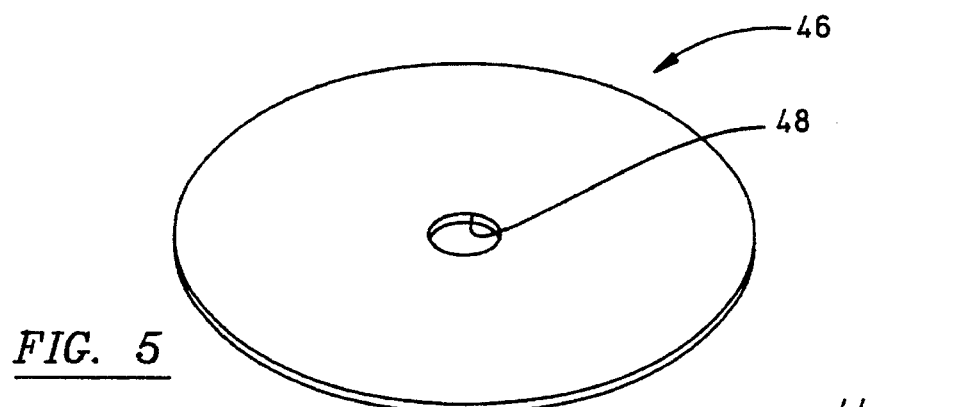
FIG. 5 is an isometric illustration of a hubless single-sided optical disk which is employed in the present invention.
Figure 6:
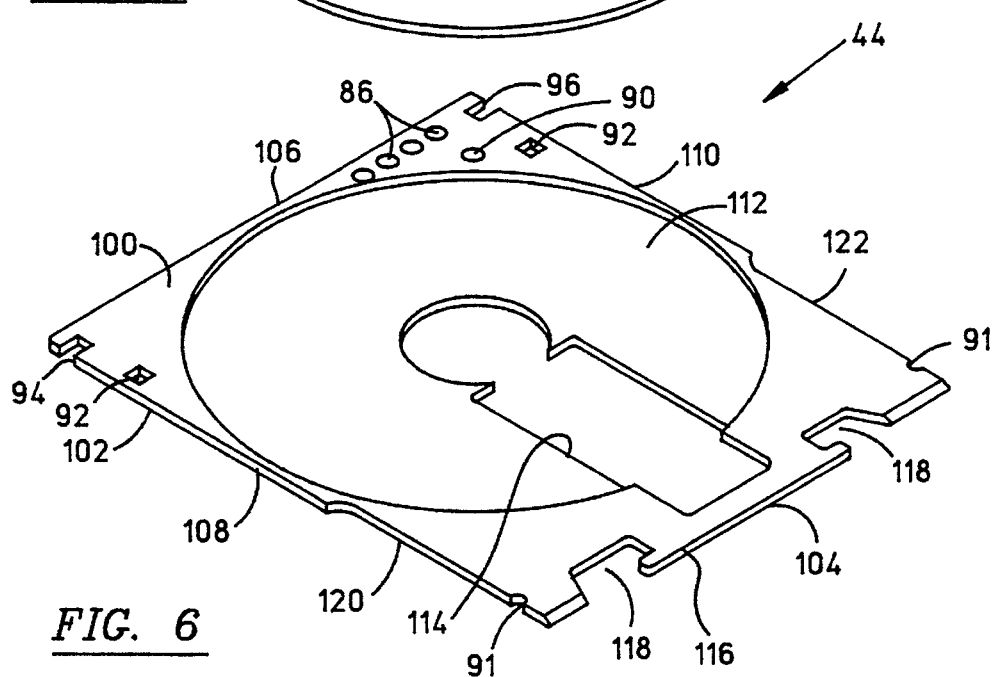
FIG. 6 is a top isometric illustration of the caddy portion of the present invention.

A top isometric illustration of the caddy portion 44 of the present invention is illustrated in FIG. 6. The caddy has top and bottom sides 100 and 102 which are bounded by leading and trailing edges 104 and 106 and side edges 108 and 110. The top side 100 has a circular recess 112 for receiving and supporting the hubless optical disk 46 shown in FIG. 5. The bottom side 108 has an aperture 114 which provides access to the disk for magnetic processing when rewritable optical disks are employed.

The leading edge 104 of the caddy 44 is provided with a camming surface 116 which is located between a pair of notches 118 which will be described in more detail hereinafter. Further, forward portions of the side edges 108 and 110 are provided with elongated notches 120 and 122, respectively, which will be described in more detail hereinafter. In conformance with the ANSI Standard, the caddy 44 may be provided with sensing holes 88, datums and holes 91 and 92, notches 94 and write protect hole 90. Since the hubless optical disk 46 of FIG. 5 is single-sided, only one set of sensing holes 86 and one write protect hole 90 are required.

Figure 7:
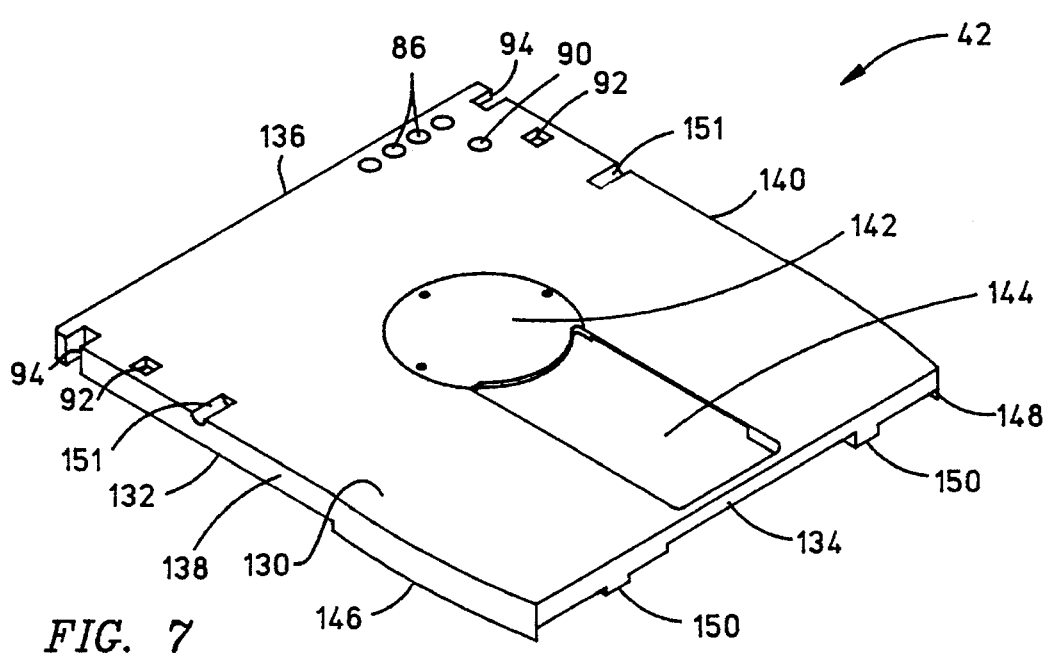
FIG. 7 is a top isometric illustration of the adapter cartridge portion of the present invention.

The adapter cartridge 42, shown in FIG. 7, has top and bottom sides 130 and 132 which are bounded by leading and trailing edges 134 and 136 and side edges 138 and 140. The top 130 may be provided with a central plate 142 and an aperture 144 which will be explained in more detail hereinafter. The bottom 132 may be provided with rails 146 and 148 at side edges 138 and 140, respectively, and stops 150 at the leading edge 134 which will be explained in more detail hereinafter. Further, the top 130 may be provided with recesses 151 for a purpose to be explained hereinafter. In accordance with the ANSI Standards, the adapter cartridge 42 may be provided with the holes 92, notches 94, sensing holes 88, and write protection hole 90.

Figure 8:
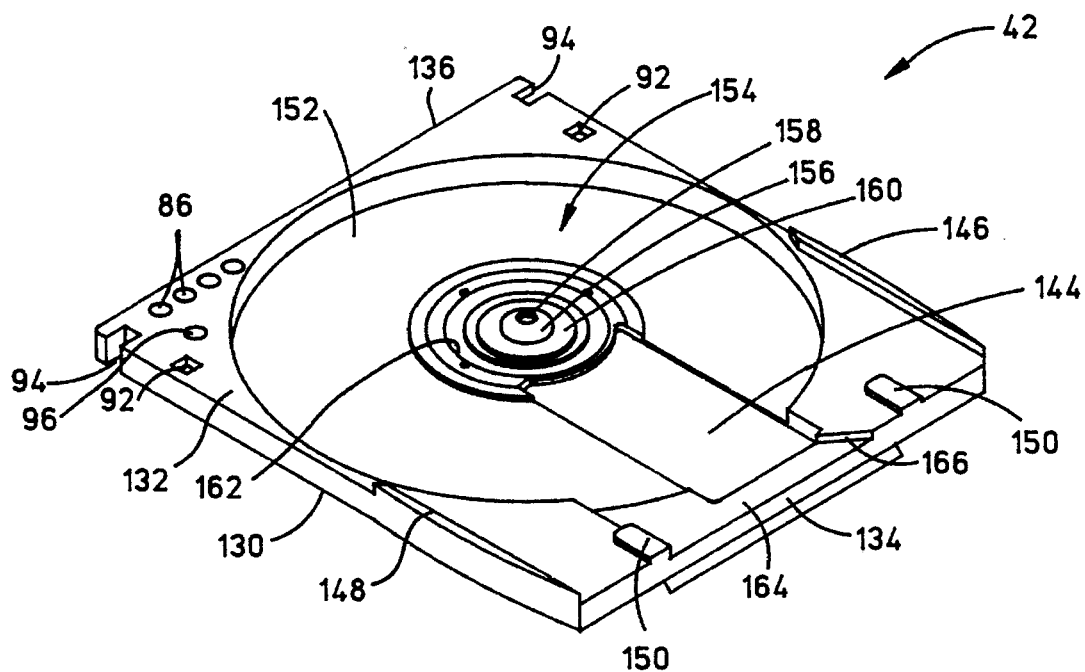
FIG. 8 is a bottom isometric illustration of the adapter cartridge portion of the present invention.

FIG. 8 illustrates a bottom view of the adapter cartridge 42. The bottom side 132 is provided with a circular recess 152 which has substantially the same diameter as the radius 112 of the caddy in FIG. 6. The rails 146 and 148 and the stops 150 of FIG. 7 are shown in more detail in FIG. 8. In the middle of the recess the top side 130 of the adapter cartridge is provided with a floating hub which is generally shown at 154. The floating hub 154 includes a hub 156 which has a central opening 158 and is connected to an annular flange 160, the hub and the annular flange being retained by a retainer ring 162 which is connected to the central plate 142 by a support ring 163, the retention being described in detail hereinafter. When the hubless disk of FIG. 5 is to be rotated, the hub 156 is received within the central opening 48 of the disk and the flange 160 engages an inner annular surface of the disk as will be described in more detail hereinafter. The leading surface 134 of the adapter cartridge will provide a camming surface for the shutter arm 60 for ejecting the adapter cartridge from the disk drive as described hereinabove. The leading edge 134 is provided with a generally central cutout 164 which is located between the stops 150 and which is less than approximately one half of the depth of the leading edge 134. The cutout 164 allows the shutter arm 60 of the drive to terminate pushing action on the leading edge of the adapter cartridge and commence pushing on the leading edge 116 of the caddy as shown in FIG. 6. This pushing operation will be described in more detail hereinafter. The cutout 164 is provided with a tapered edge 166 which allows smooth transition of the shutter arm 60 from the leading edge 134 of the adapter cartridge to the leading edge 116 of the caddy as will be explained in more detail hereinafter.

Figure 9:
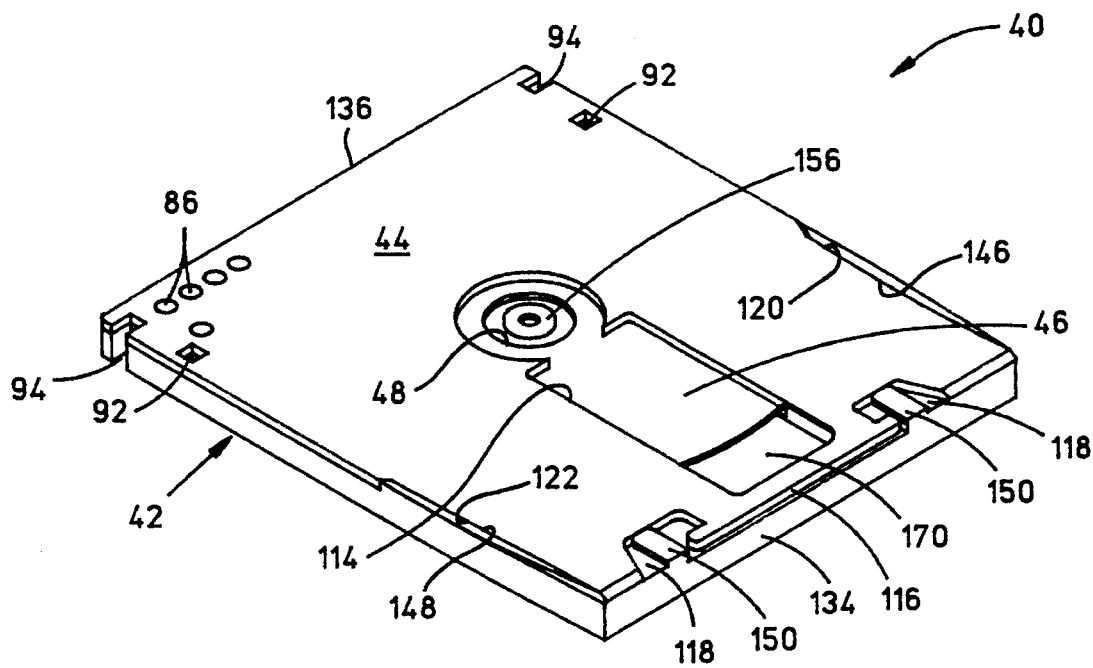
FIG. 9 is a bottom isometric illustration of the cartridge of the present invention which comprises an adapter cartridge and a caddy, the cartridge containing a single-sided optical disk.

The cartridge 40 of the present invention is shown in FIG. 9 with the optical disk 46 contained therein. FIG. 9 is a bottom view of the cartridge which means that when the cartridge 40 is inserted into a disk drive it is flipped over and inserted in the drive with the leading edge 134 proceeding the trailing edge 136. The cartridge 40 comprises the mating of the caddy 44 and the adapter cartridge 42, the mating being accomplished by positioning components which include the cutouts 120 and 122 of the caddy receiving the rails 146 and 148 of the adapter cartridge and the cutouts 118 of the caddy receiving the stops 150 of the adapter cartridge. In the mated position, the recess 112 of the caddy in FIG. 6 and the recess 152 of the adapter cartridge in FIG. 8 form an enclosure 170 for the optical disk 46. In the preferred embodiment, the leading edge 116 of the caddy is substantially aligned with the leading edge 134 of the adapter cartridge -for a purpose to be explained in more detail hereinafter.

FIGS. 10A and 10B illustrate the ejection of the adapter cartridge 42 and the caddy 44 from the disk drive and FIG. 10C illustrates the ejection of the caddy 44 from the adapter cartridge 42. These ejections are accomplished by the shutter arms 58 and 60, the shutter arm 60 being below (closest to the reader in FIGS. 10A, 10B, and 10C) the shutter arm 58. First ends of the shutter arms 58 and 60 are pivotally connected to spring elements 172 and 174 which bias the arms in a swinging motion to left in FIGS. 10A, 10B, and 10C. Pins or rollers 176 and 178 are connected to opposite ends of the shutter arms 58 and 60 and slidably bear against the camming surfaces 116 and 134 of the caddy and the adapter cartridge respectively. The roller 178 always rolls on the camming surface 134 of the adapter cartridge while the roller 178 first rolls on both of the camming surfaces 116 and 134 and then because of the cutout 164, shown in FIG. 10C, the roller 176 will roll only on the camming surface 116 of the caddy. In FIG. 10A the cartridge 40 is shown in a fully inserted position within the disk drive. In this position the cartridge is retained by the loader 50 which causes pins (not shown) in the drive to be inserted in the openings 92 (FIG. 9). When the loader is moved upwardly by a signal from the controlling program, the cartridge is released from the drive thereby allowing the spring biased shutter arms 58 and 60 to partially eject the cartridge 40. After partial ejection, the adapter cartridge 42 is frictionally retained. By the spring biased detent 62, shown in FIG. 3, which is received by the recesses 151 in the adapter cartridge as shown in FIG. 7. At this stage, the shutter arm 60 is at the beginning of the taper 166 at which time it terminates pushing on the adapter cartridge and commences pushing on the caddy causing the caddy to be ejected from the adapter cartridge as shown in FIG. 10C. The result is shown in FIG. 3 where the picker 28 is grabbing the caddy 44 which has been partially ejected from the adapter cartridge 42. These steps are reversed when the picker is inserting the caddy 44 into the cartridge 42 and pushing the cartridge 42 into the disk drive by the grabber arms 64 and 66 and the plunger 68. This arrangement eliminates the necessity of transporting the disk in a prior art cartridge as shown in FIG. 4. The disk can simply be transported in the caddy which eliminates the requirement of a cartridge for each disk and thereby reduces the cost of the storage library shown in FIG. 1. Further, the invention increases storage density by substantially two fold. The typical cartridge for a double-sided optical disk is 11.3 mm thick whereas the caddy for the single-sided optical disk is 3.0 mm thick. The ejection of the adapter cartridge 42 and the caddy 44 are discussed in more detail hereinafter with reference to FIGS. 13–16.

Figure 11:
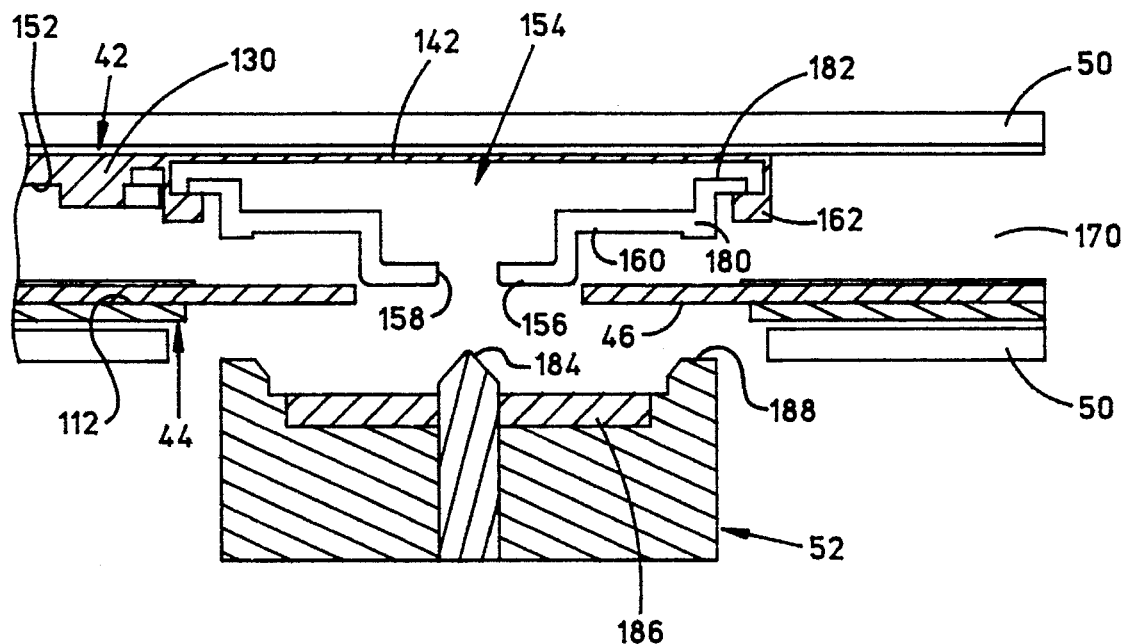
FIG. 11 is a vertical cross section of the cartridge and disk of the present invention inserted within a loader tray of an optical disk drive with the spindle of the drive disengaged from the cartridge.

FIG. 11 is a partial view of the disk 46, caddy 44 and the adapter cartridge 42 mounted in a loader tray 50 of the disk drive. The recess 112 of the caddy and the recess 152 of the adapter cartridge provide the enclosure 170 for the disk 46 when the caddy 44 is mated with the adapter cartridge 42 as shown in FIG. 11. FIG. 11 shows the aforementioned floating hub 154 which includes the hub 156, the central opening 158, the annual flange 160, the retainer ring 162, and the plate 142. The annular flange 160 is connected to a ring 180 which in turn is connected to an outwardly extending annular flange 182. The flange 182 rests upon the retainer ring 162 and is captured between the retainer ring 162 and the plate 142. There is sufficient space between the retainer ring 162 and the plate 142 so that the flange 182 can be spaced therebetween for a floating action which will be described in more detail hereinafter. The spindle 52 includes a central post 184, which may be an output shaft of the drive motor (not shown), which is receivable within the opening 158 of the hub 156. Surrounding the post 184 there may be provided a magnet 186. The hub 156 is preferably constructed of a magnetic material so that the magnet 186 will magnetically attract and clamp the hub 156 as will be explained in more detail hereinafter. The spindle 52 is provided with an annular rim 188 for engaging a bottom surface portion of the disk 46 for rotating the disk which will be explained in more detail hereinafter.

Figure 12:
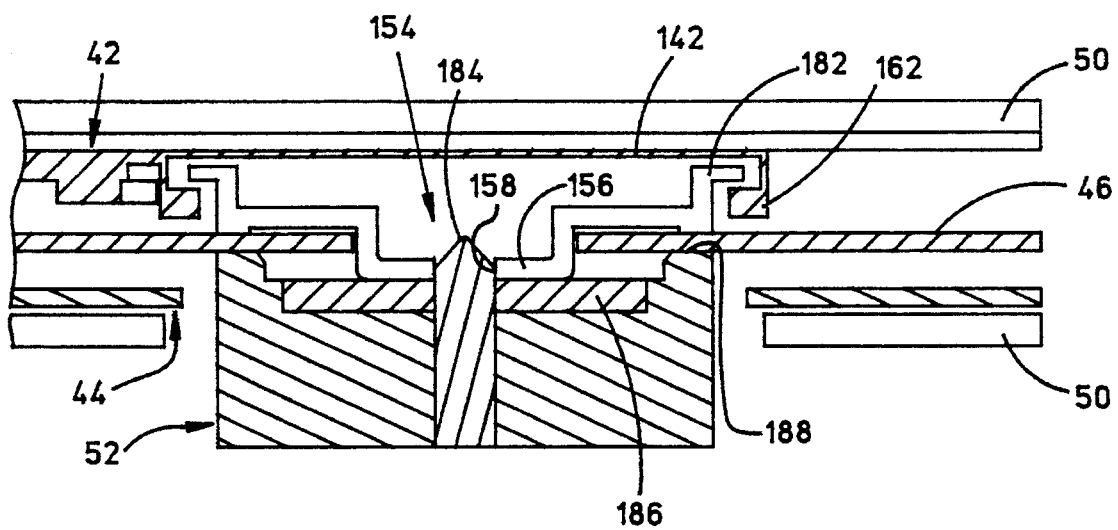
FIG. 12 is the same as FIG. 11 except the spindle of the drive is engaged with the cartridge for rotating the optical disk.

FIG. 12 is the same illustration as FIG. 11 except the loader tray 50 has moved downwardly causing the cartridge comprising the caddy 44 and the adapter cartridge 42 to be moved downwardly toward the spindle 52. This causes the magnet 186 to magnetically clamp the hub 156 with the post 184 inserted in the opening 158. Simultaneously, the annular rim 188 of the spindle engages the bottom of the disk 46 so that the disk can be rotated by the disk motor. During this operation, the flange 182 is positioned between the retainer 162 and the plate 142 (floating) so that there is no rubbing action of the floating hub 154 while the disk 46 is being rotated.

FIG. 13 is the same as FIG. 12 except the complete disk 46, caddy 44 and adapter cartridge 42 are illustrated. In FIG. 13 the components are fully inserted into the disk drive and the disk 46 is being rotated by the spindle 52. FIG. 14 is the same as FIG. 11 except the full length of the components 42, 44 and 46 are shown. In FIG. 14 the loader tray 50 of the disk drive has moved upwardly disengaging the spindle 52 from the disk 46 and the floating hub 154. FIGS. 13 and 14 show a magnet 190 which may be optionally placed on the top of the top loader tray of the disk drive which is for a purpose to be explained hereinafter.

Figure 15:
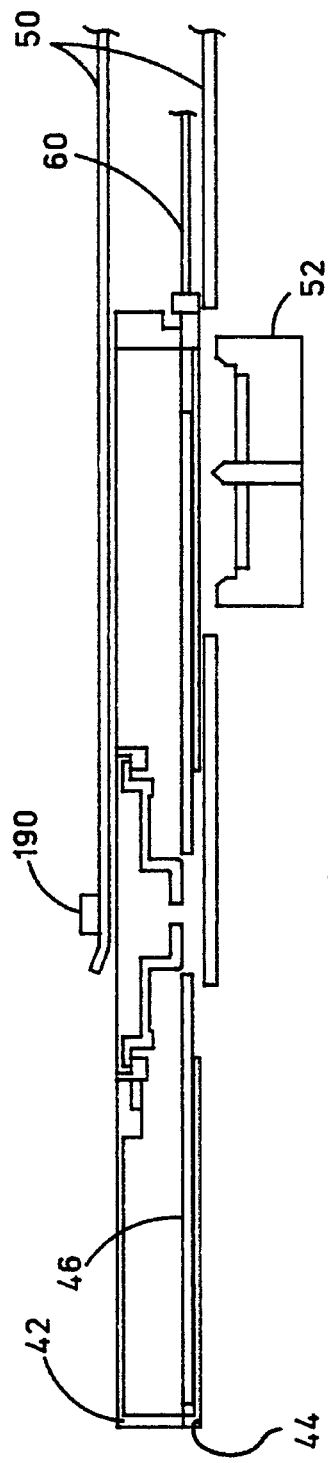
FIG. 15 is the same as FIG. 14 except the cartridge has been ejected partially from the loader tray and drive by spring biased shutter arms within the drive.
Figure 16:
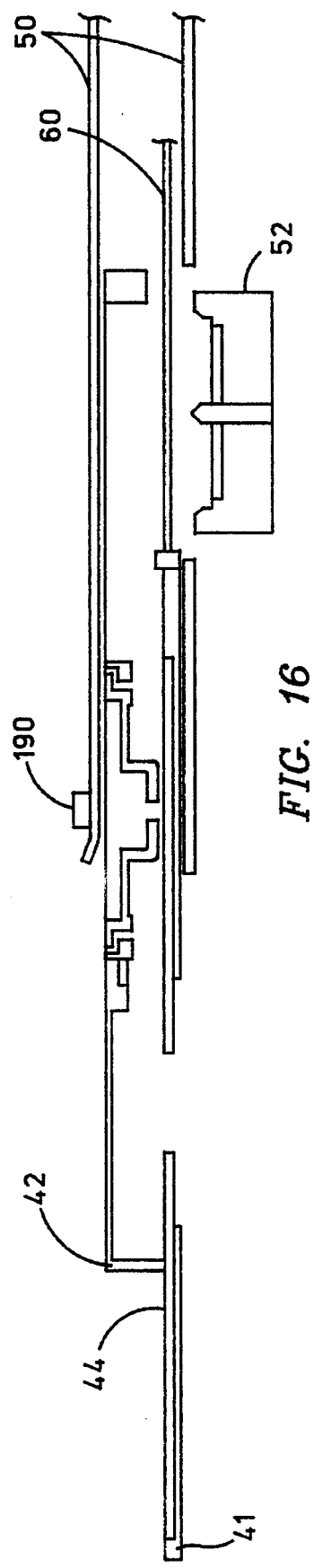
FIG. 16 is the stone as FIG. 15 except the caddy portion of the present invention has been partially ejected from the adapter cartridge portion by the bottom spring biased shutter arm in the drive.

FIG. 15 shows a side view of FIG. 10B wherein the adapter cartridge 42 and the caddy 44 have been partially ejected together by the shutter arms 58 and 60. FIG. 16 is a side view of FIG. 10C with the caddy 44 ejected from the adapter cartridge 42 by the shutter arm 60. The magnet 190, which is optional, is employed as shown in FIG. 16 for retaining the floating hub 154 in an upward position to ensure clearance for the ejection of the caddy 44 from the adapter cartridge 42. In the preferred embodiment, however, the bottom of the hub 156 is positioned slightly above the top surface of the disk 46 when it is resting in the recess of the caddy 44 as shown in FIG. 11.

Figure 17:
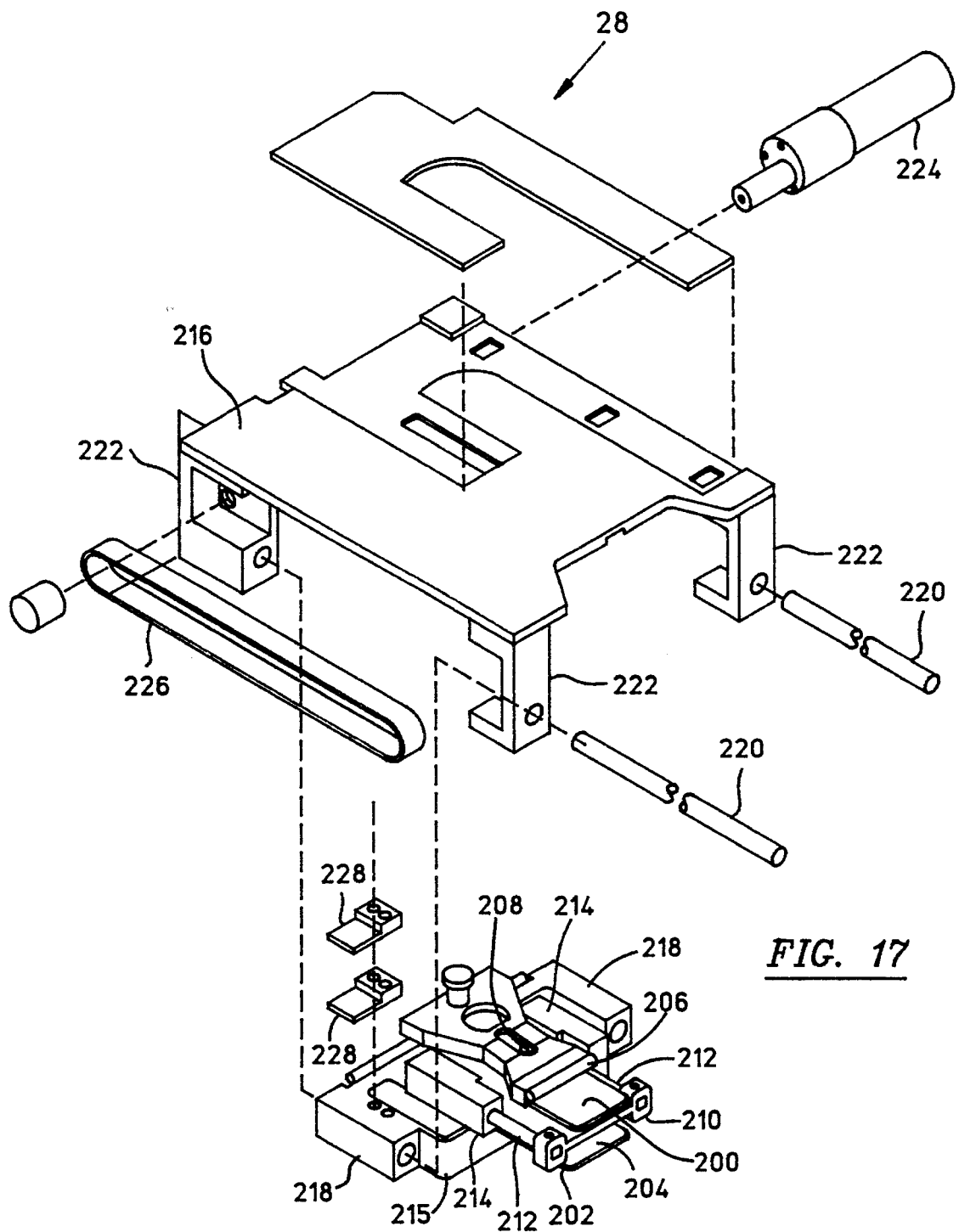
FIG. 17 is an isometric illustration of an exemplary picker which may be employed for the present invention.

An exploded illustration of an exemplary embodiment for the picker 28 is shown in FIG. 17. The picker 28 may include top and bottom jaws 200 and 202 which have forwardly located inwardly facing lips, the lip for the bottom jaw 202 being illustrated at 204. The lips of the jaws 200 and 202 are adapted to grab the caddy 44 of the present invention with the disk recessed therein. Each jaw is pivoted, the top jaw 200 being pivoted at 206. The jaws are opened and closed by a solenoid 208. Intermediate the jaws is a plunger 210 which reciprocates in a horizontal direction for pushing the adapter cartridge 42 and the caddy 44 into the disk drive after the jaws have been opened. The horizontal movement of the plunger 210 is caused by the pistons 212 which are part of the longitudinal solenoids 214. A support plate 215, which mounts the jaws 200 and 204, slides back and forth with respect to a top support plate 216 so that the jaws can move in a horizontal direction to withdraw or insert the caddy 44 with the disk 46 with respect to a storage bin 22, shown in FIG. 1, or the opening 26 of the drive 24. This is accomplished by providing the support plate 215 with journals 218 which slidably receive rods 220 which, in turn, are mounted at the bottom of the support plate 216 by downwardly extending flanges 222. A motor 224 is connected to the support plate 216 and operates a belt 226 which is connected to the support plate 215 by a pair of secured tabs 228. When the motor 224 is operated, the support plate 215, which carries the jaws 200 and 202, is operated in a horizontal direction for inserting and withdrawing the caddy 44 with the disk 46 resting therein.

The present invention provides a cartridge which enables a hubless optical disk to be employed in a disk drive. Further, by unique configurations of adapter cartridge and caddy portions of the cartridge, a standard optical disk drive can be employed to partially eject the adapter cartridge and caddy together and then subsequently eject the caddy from the adapter cartridge for easy access of the cartridge by an operator or by a picker of a library storage arrangement as shown in FIG. 1. In the library arrangement of FIG. 1, the optical disk can be transported in a caddy in lieu of a prior art cartridge as shown in FIG. 4 which significantly reduces the cost of the storage library. While the present invention has been described in conjunction with optical disks, it should be understood that the spirit of the invention can be employed for double-sided hubless optical disks as well as single-sided or double-sided magnetic disks.

Although the invention has been described in terms of the specific embodiments, the inventors contemplate modifications and substitutions to various components of the invention which would occur to a person of ordinary skill in the art, and therefore, would be in the scope of the invention, which is to be limited only by the claims which follow.

We claim:

1. A cartridge for a hubless disk which can be moved by a laterally moving shutter arm in a disk drive for transporting the disk within the drive and projecting the disk from the drive, the disk having a circular periphery with a central opening, the cartridge comprising:

an adapter cartridge having top and bottom surfaces bounded by leading and trailing edges and a pair of side edges, the bottom surface of the adapter cartridge having a recess for receiving the disk the adapter cartridge being adapted for permanent employment in the disk drive;

a caddy having top and bottom surfaces which are bounded by leading and trailing edges and a pair of side edges, the top surface of the caddy having a recess for receiving the disk the caddy being adapted for employment in and removal from the disk drive;

the caddy and the adapter cartridge being slidable with respect to one another upon engagement when their recesses generally face one another;

the caddy and the adapter cartridge providing an enclosure for the disk when their recesses face each other in an opposite relationship with the recesses providing the disk with freedom of vertical movement between a downward resting position on a bottom of the recess of the caddy and a suspended position between bottoms of the recesses;

the adapter cartridge and the caddy having positioning means for mating the caddy with the adapter cartridge in a closed position with respect to one another with the recesses facing each other in said opposite relationship so that the recesses provide said enclosure for the disk and for guiding the caddy for slidable movement with respect to the adapter cartridge in a first direction toward the trailing edge of the adapter cartridge and for slidable movement with respect to the adapter cartridge in a second direction toward the leading edge of the adapter cartridge until stopped at said closed position;

the leading edges of the adapter cartridge and the caddy being adjacent with respect to one another;

the bottom surface of the adapter cartridge having another recess which is adjacent the leading edge of the adapter cartridge so as to provide the leading edge with a reduced height leading edge portion and a full height leading edge portion; and the leading edge of the caddy being spaced above the reduced height leading edge portion when the caddy is mated with the adapter cartridge in said closed position, whereby said shutter arm engages the leading edge of the adapter cartridge along the full height leading edge portion to push both the adapter cartridge and the caddy in said first direction and then disengages the leading edge of the adapter cartridge along the reduced height leading edge portion to engage only the leading edge of the caddy to slide the caddy further in said first direction while the adapter cartridge remains stationary to facilitate removal of the caddy from the adapter cartridge and the disk drive.

2. A disk drive including the cartridge as claimed in claim 1, the disk drive including:

a housing having an opening for the cartridge;

the caddy having an opening through its recess;

a loader tray mounted inside the housing adjacent the opening of the housing for receiving the cartridge with the opening in the caddy opening downwardly;

a read and write element mounted in the housing for reading and writing the disk through the opening in the caddy; and said shutter arm being spring mounted in the housing for engaging the leading edges of the adapter cartridge and the caddy.

3. A disk media library including the disk drive of claim 2, the disk media library including:

a plurality of storage bins for storing a plurality of caddies which are adapted to contain hubless disk media:

the caddy having an extended portion with respect to the adapter cartridge after being moved in said first direction:

transport means, including a picker, for transporting a hubless disk medium between a storage bin and the disk drive; and the picker being adapted to grab the extended portion of the caddy for transporting the caddy from the disk drive to a storage bin.

4. A cartridge as claimed in claim 1 further including:

an adapter cartridge hub being adapted to engage the disk within said central opening, the adapter cartridge hub having a central hole for receiving a central post of a spindle;

retainer means rotatably mounting the adapter cartridge hub to the adapter cartridge so that the adapter cartridge hub engages the disk within said central opening when the disk is suspended between said recesses; and the caddy having an opening for allowing reading and writing of the disk through the opening when the disk is located in the enclosure formed by said recesses.

5. A cartridge as claimed in claim 4 further including:

the adapter cartridge hub being made of a magnetic material.

6. A cartridge as claimed in claim 4 wherein the retainer means includes:

the adapter cartridge hub having an outwardly extending annular retainer flange;

the adapter cartridge having a retainer ring; and the retainer flange being supported by the retainer ring when the adapter cartridge hub is in a downward resting position and the retainer flange being spaced above the retainer ring when the adapter cartridge hub is in an upward floating position.

7. A cartridge as claimed in claim 6 further including:

the adapter cartridge hub having an outwardly extending annular disk engaging flange engaging the disk:

the retainer means further including:

a hub ring mounted about the disk engaging flange;

the retainer flange being mounted to and extending outwardly from said hub ring;

a plate; and a support ring interconnecting the plate to the retainer ring so as to cage the retainer flange and allow vertical movement of the retainer flange when the hub is moved between its downwardly resting position and its upward floating position.

8. A cartridge as claimed in claim 7 further including:

the bottom of the recess of the caddy being located so that when the disk is supported on the bottom of the recess of the caddy the top surface of the disk is located below a bottom of the adapter cartridge hub when the adapter cartridge and the caddy are mated and said adapter cartridge hub is in said downward resting position.

9. A cartridge as claimed in claim 8 further including:

the adapter cartridge hub being made of a magnetic material.

10. A cartridge as claimed in claim 1 further including:

the positioning means positioning the leading edge of the caddy substantially flush with the leading edge of the adapter cartridge.

11. A cartridge as claimed in claim 10 wherein the positioning means includes:

the adapter cartridge having a pair of spaced apart substantially parallel rails which extend downwardly from the side edges of the adapter cartridge;

the side edges of the caddy having cutouts for slidably receiving the rails;

the adapter cartridge having a stop for engaging the leading edge of the caddy; and the rails and the stop being located so that when the cutouts of the side edges of the caddy receive the rails and the stop engages the leading edge of the caddy the adapter cartridge and the caddy are mated with the recesses forming said enclosure.

12. A disk drive including the cartridge as claimed in claim 11, the disk drive including:

a housing having an opening for the cartridge;

the caddy having an opening through its recess;

a loader tray mounted inside the housing adjacent the opening of the housing for receiving the cartridge with the opening in the caddy opening downwardly;

a read and write element mounted in the housing for reading and writing the disk through the opening in the caddy; and said shutter arm being spring mounted in the housing for engaging the leading edges of the adapter cartridge and the caddy.

13. A disk media library system including the disk drive of claim 12, the disk media library including:

a plurality of storage bins for storing a plurality of caddies which are adapted to contain hubless disk media;

the caddy having an extended portion with respect to the adapter cartridge after being moved in said first direction;

transport means, including a picker, for transporting a hubless disk medium between a storage bin and the disk drive; and the picker being adapted to grab the extended portion of the caddy for transporting the caddy from the disk drive to a storage bin.

14. A cartridge as claimed in claim 11 further including:

an adapter cartridge hub being adapted to engage the disk within said central opening, the adapter cartridge hub having a central hole for receiving a central post of a spindle;

retainer means rotatably mounting the adapter cartridge hub to the adapter cartridge so that the hub engages the disk within said central opening when the disk is suspended between said recesses; and the caddy having an opening for allowing reading and writing of the disk through the opening when the disk is located in the enclosure formed by said recesses.

15. A cartridge as claimed in claim 14 further including:

the hub being made of a magnetic material.

16. A disk drive including the cartridge as claimed in claim 14, the disk drive including:

a housing having an opening for the cartridge;

the caddy having an opening through its recess;

a loader tray mounted inside the housing adjacent the opening of the housing for receiving the cartridge with the opening in the caddy opening downwardly;

a read and write element mounted in the housing for reading and writing the disk through the opening in the caddy; and said shutter arm being spring mounted in the housing for engaging the leading edges of the adapter cartridge and the caddy.

17. A disk drive as claimed in claim 16 further including:

a magnet mounted on a top trailing portion of the loader tray for attracting the spindle to an upward position when the adapter cartridge is partially inserted in the loader tray.

18. A disk drive as claimed in claim 16 further including:

the adapter cartridge hub being made of a magnetic material;

a drive motor mounted in the housing for rotating the disk;

a spindle mounted to the drive motor, the spindle carrying said post for extension into the central hole of the adapter cartridge hub and a magnet mounted about the post for attracting the adapter cartridge hub; and the loader tray being mounted for movement between top and bottom positions;

the bottom position of the loader tray causing the spindle to be engaged with a bottom surface of the disk with the adapter cartridge hub magnetically clamped to the magnet, the post inserted in the hole of the adapter cartridge hub and the retainer flange floating above the retainer ring; and the top position of the loader tray causing the spindle to disengage the disk causing the disk to rest on the bottom of the recess of the caddy and the retainer flange to rest on the retainer ring.

19. A disk media library system including the disk drive of claim 18, the disk media library including:

a plurality of storage bins for storing a plurality of caddies which are adapted to contain hubless disk media;

the caddy having an extended portion with respect to the adapter cartridge after being moved in said first direction;

transport means, including a picker, for transporting a hubless disk medium between a storage bin and the disk drive; and the picker being adapted to grab the extended portion of the caddy for transporting the caddy from the disk drive to a storage bin.

20. A cartridge as claimed in claim 14 wherein the retainer means includes:

the hub having an outwardly extending annular retainer flange;

the adapter cartridge having a retainer ring; and the retainer flange being supported by the retainer ring when the hub is in a downward resting position and the retainer flange being spaced above the retainer ring when the hub is in an upward floating position.

21. A cartridge as claimed in claim 20 further including:

the hub having an outwardly extending annular disk engaging flange for engaging the disk;

the retainer means further including:

a hub ring mounted about the disk engaging flange;

the retainer flange being mounted to and extending outwardly from said hub ring;

a plate; and a support ring interconnecting the plate to the retainer ring so as to cage the retainer flange and allow vertical movement of the retainer flange when the hub is moved between its downwardly resting position and its upward floating position.

22. A cartridge as claimed in claim 21 further including:

the bottom of the recess of the caddy being located so that when the disk is supported on the bottom of the recess of the caddy the top surface of the disk is located below a bottom of the adapter cartridge hub when the adapter cartridge and the caddy are mated and said adapter cartridge hub is in said downward resting position.

23. A cartridge as claimed in claim 22 further including:

the hub being made of a magnetic material.

24. A disk drive including the cartridge as claimed in claim 23, the disk drive including:

a housing having an opening for the cartridge;

the caddy having an opening through its recess;

a loader tray mounted inside the housing adjacent the opening of the housing for receiving the cartridge with the opening in the caddy opening downwardly;

a read and write element mounted in the housing for reading and writing the disk through the opening in the caddy; and said shutter arm being spring mounted in the housing for engaging the leading edges of the adapter cartridge and the caddy.

25. A disk drive as claimed in claim 24 further including:

a drive motor mounted in the housing for rotating the disk;

a spindle mounted to the drive motor, the spindle carrying said post for extension into the central hole of the hub and a magnet mounted about the post for attracting the hub; and the loader tray being mounted for movement between top and bottom positions;

the bottom position of the loader tray causing the spindle to be engaged with a bottom surface of the disk with the hub magnetically clamped to the magnet, the post inserted in the hole of the hub and the retainer flange floating above the retainer ring; and the top position of the loader tray causing the spindle to disengage the disk causing the disk to rest on the bottom of the recess of the caddy and the retainer flange to rest on the retainer ring.

26. A disk media library system including the disk drive of claim 25, the disk media library including:

a plurality of storage bins for storing a plurality of caddies which are adapted to contain hubless disk media;

the caddy having an extended portion with respect to the adapter cartridge after being moved in said first direction;

transport means, including a picker, for transporting a hubless disk medium between a storage bin and the disk drive; and the picker being adapted to grab the extended portion of the caddy for transporting the caddy from the disk drive to a storage bin.

* * * * *

UNITED STATES PATENT AND TRADEMARK OFFICE
CERTIFICATE OF CORRECTION

PATENT NO.   :   5,610,902
DATED        :   March 11, 1997
INVENTOR(S)  :   Childers et al It is certified that error appears in the above-indentified patent and that said Letters Patent is hereby corrected as shown below:

Column 9, line 14, change "the disk the adapter" to --the disk, the adapter--.

Column 9, line 20, change "the disk the caddy" to --the disk, the caddy--.

Column 10, line 52, add --for-- after "flange".

Signed and Sealed this

Ninth Day of September, 1997

Attest:

*Attesting Officer*

BRUCE LEHMAN

*Commissioner of Patents and Trademarks*